(12) United States Patent
Barbeau et al.

(10) Patent No.: US 8,169,342 B1
(45) Date of Patent: May 1, 2012

(54) METHOD OF PROVIDING A DESTINATION ALERT TO A TRANSIT SYSTEM RIDER

(75) Inventors: Sean J. Barbeau, Tampa, FL (US);
Philip L. Winters, Tampa, FL (US);
Rafael Perez, Temple Terrace, FL (US);
Miguel Labrador, Tampa, FL (US);
Nevine Georggi, Valrico, FL (US);
Dmytro Bilov, Palm Harbor, FL (US)

(73) Assignee: University of South Florida, Tampa, FL (US)

( * ) Notice: Subject to any disclaimer, the term of this patent is extended or adjusted under 35 U.S.C. 154(b) by 629 days.

(21) Appl. No.: 12/234,778

(22) Filed: Sep. 22, 2008

Related U.S. Application Data (63) Continuation-in-part of application No. 11/464,079, filed on Aug. 11, 2006.

(60) Provisional application No. 60/707,216, filed on Aug. 11, 2005.

(51) Int. Cl.
*G08B 21/00* (2006.01)

(52) U.S. Cl. ............... 340/994; 340/539.11; 340/539.13

(58) Field of Classification Search ............. 340/539.11, 340/539.13, 994; 701/200, 206, 208, 213
See application file for complete search history.

(56) References Cited

U.S. PATENT DOCUMENTS 6,411,899 B2 * 6/2002 Dussell et al. ................ 701/211

* cited by examiner

*Primary Examiner* — Jeffery Hofsass
(74) *Attorney, Agent, or Firm* — Molly L. Sauter; Courtney M. Dunn; Smith & Hopen, P.A.

(57) ABSTRACT

Provided is a detection method used to alert a rider of a transit system that his or her upcoming destination location is approaching. The method detects upcoming transit stops and alerts the transit rider to prepare to depart the transit vehicle. Another alert to request a stop at the appropriate time may also be given. The detection method detects a destination location when the transit vehicle is not going to stop and service the second-to-last, or triggering, stop and when the transit vehicle stops at the triggering location and then resumes travel towards the destination location. The detection method establishes a triggering location, two regions about the triggering location, a destination location, a destination region about the destination location, and a current location and speed from available location data. The method then triggers alerts based on the current speed and the current location's position within or without the established regions.

24 Claims, 5 Drawing Sheets

FIG. 1

PRIOR ART

METHOD OF PROVIDING A DESTINATION ALERT TO A TRANSIT SYSTEM RIDER

CROSS REFERENCE TO RELATED APPLICATIONS

This application is a continuation-in-part of currently pending U.S. patent application Ser. No. 11/464,079, entitled, "Travel Assistant Device" filed Aug. 11, 2006; and claims priority to U.S. Provisional Patent Application 60/707,216, entitled, "Technology to Assist Transit Riders with Special Needs", filed Aug. 11, 2005, the contents of which are herein incorporated by reference.

STATEMENT OF GOVERNMENT INTEREST

This invention was made with Government support under Grant No. FDOT-BD-549, RP WO#33 NCTR-77711-00 awarded by the Florida Department of Transportation. The Government has certain rights in the invention.

FIELD OF INVENTION

This invention relates to the field of transportation. More specifically, this invention relates to the use of global positioning systems and wireless communication systems to provide timely transit system information to riders of transit systems.

BACKGROUND OF THE INVENTION

Public transportation is becoming an increasingly important and complex means of transportation. For many individuals, public transportation is their only available means of transportation. Because they cannot drive, do not have a car, or have a physical or mental disability, these individuals must rely solely on public transportation. Many of these individuals are intimidated by the complexities of public transit, including identifying proper routes and transfer points according to schedule, and therefore remain trapped in their homes. For those with special needs, it is especially daunting to get from one location to another without any assistance, especially on their first few trips. Some of these individual have failing sight or hearing that can make it difficult for them to read the transit vehicle's schedule or hear the transit vehicle's driver announce stops. Many of these riders have varying degrees of mental or physical disabilities that requires another person to guide them through the process.

Transit agencies now employ "travel trainers," whose sole job is to teach new riders with special needs how to successfully travel to and from a particular location using transit systems. Due to the amount of time required in teaching and monitoring individuals with various needs, there is often an extensive waiting list for such assistance from the travel trainers. Travel trainers ride with the individual until they feel that the rider can properly navigate the transit system on their own. At that point, the travel trainer will let the person ride by himself or herself for the first time. The travel trainer or family members usually follow the transit vehicle by car in order to guarantee that the rider makes it safely to their intended destination location. For those who successfully learn to navigate the transit system, often the caretaker of the individual is reluctant to allow them to travel without any supervision, usually due to the fear that the person may become lost and unable to return home.

Using public transit can be daunting even where a rider does would not be categorized as having special needs. Navigating the transit system can be a major obstacle for attracting new riders. A range of techniques from advertising to online trip planners to travel trainers is used by transit agencies to overcome this barrier to increase ridership. Research has found that current informational materials do not fully meet this need. According to the National Center for Transit Research (NCTR), approximately half of the general population surveyed could not successfully plan an entire trip on the fixed-route transit system using printed information materials. This situation is magnified for many of the fifty million Americans with disabilities who depend on transit systems as their primary means to and from school, work, doctor appointments, and other essential activities. For those with cognitive disabilities (approximately 14.2 million Americans, or 6.9% of the population), it is especially daunting to plan and execute a trip without any personal assistance from travel trainers provided by the transit agency or other group, especially on their first few trips.

With the proper software, Global Positioning System (GPS)-enabled mobile phones can be used as navigation devices for transit riders to aid the rider in exiting the vehicle at a proper transit stop. In this type of device, two forms of alerts are typically given to the rider: "Get Ready," indicating that the rider's stop is approaching, and "Pull the Cord Now," indicating that the rider should initiate a stop request by pulling a cord or pressing a button. Because of the limitations of computing resources on the mobile phone, which prevent advanced spatial queries, and the lack of regularly available complex spatial data from the transit agencies that would define the actual path the transit vehicle travels, transit stop detection methods on the mobile phone must be extremely efficient.

Figure 1:
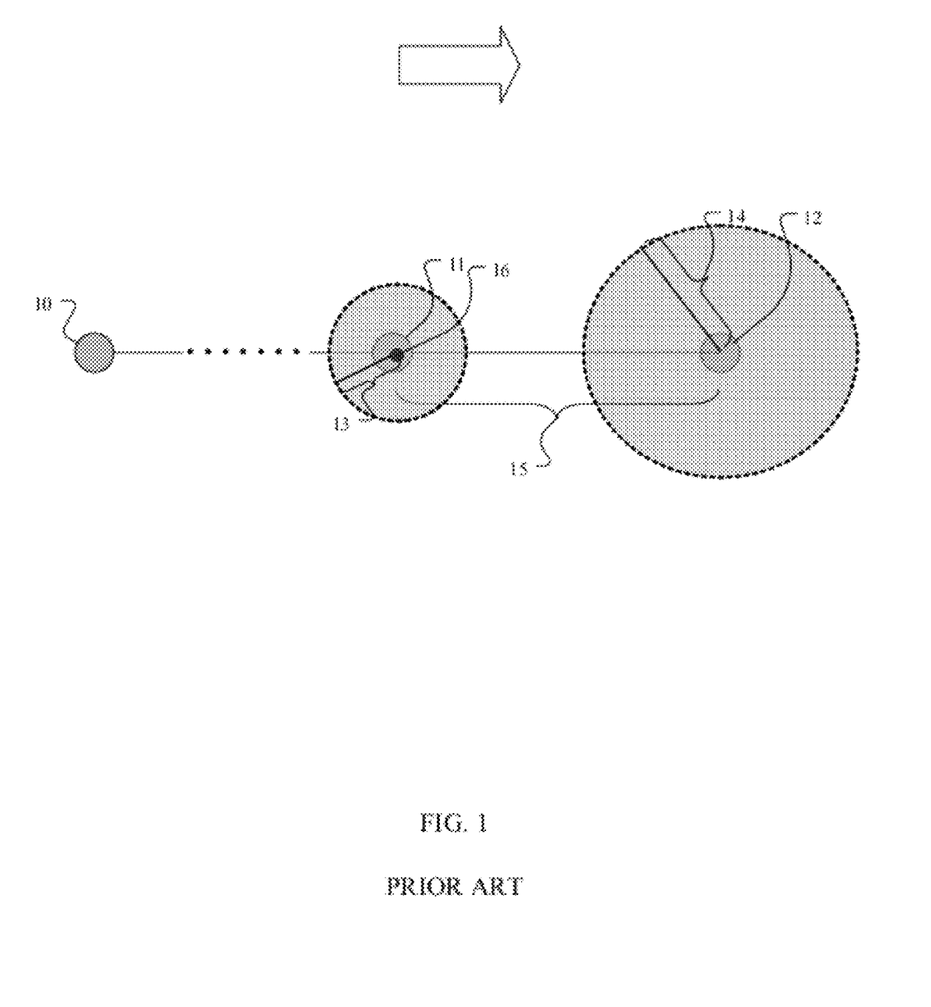
FIG. 1 is an illustration of a geo-fencing method of the prior art.

Simple geo-fencing methods may be utilized that detect when the device comes within a certain distance of the destination location. The diagram in FIG. 1 demonstrates a simple geo-fencing method. FIG. 1 shows starting location 10, the second-to-last scheduled stop, or triggering location 11, destination location 12, and real-time mobile device position 16. Optimally, destination geo-fence radius 14 is maximized in order to give an alert to the rider as soon as possible to allow him or her to prepare to exit the transit vehicle at destination location 12. However, in order to prevent the second alert, such as "Pull the Cord Now", from being triggered too soon, the geo-fence radius 14 cannot exceed distance 15 between triggering location 11 and destination location 12. Because the actual travel distance between the locations is not known, the minimum possible distance between scheduled transit stops must be assumed using this type of method. Because there is uncertainty in calculated GPS positions, to use this method in the real world, GPS uncertainty value 13 must also be taken into account. Therefore, geo-fence radius 14 must be at least several meters less than the difference between GPS uncertainty value 13 subtracted from the distance between triggering location 11 and destination location 12 (or maximum geo-fence radius 14<distance 15−uncertainty value 13). This simple geo-fencing method results in challenges when attempting to give the transit rider timely alerts when transit stops are very close together. Additionally, because the method is limited by the minimum possible distance between the triggering location and destination location, a very early alert is not possible for locations that are far apart.

Accordingly, an improved method of detecting an approaching transit stop is needed that is more accurate and provides more timely alerts than those methods presently available.

SUMMARY OF INVENTION

The present invention includes a method of detecting an approaching destination location in a transit system based on the knowledge of the location of the triggering, or second-to-last, scheduled transit stop in coordination with other measurements and alerting a transit system rider of the upcoming destination location at the appropriate time. The method avoids alerting the rider before they pass the triggering location through a process of detection centered around the triggering location. The method is able to detect the approaching destination location and alert the rider at the appropriate time even when scheduled transit stops are close together. This method is a significant improvement over simple geo-fencing methods and produces fewer false positives and fewer false negatives.

The method may be implemented in Java Micro Edition (Java ME) software, called the "Travel Assistant Device". U.S. patent application Ser. No. 11/464,079, which is herein incorporated by reference, provides a travel assistant device to help individuals use transit systems. The device is particularly suited to help individuals with special needs (i.e. physical or mental disabilities) successfully navigate the transit system through cues that are delivered through the device. In certain embodiments, the device utilizes a global positioning system (GPS)-enabled mobile phone. The GPS features of the mobile phone enable the location of a transit rider to be identified. The device can be integrated with vehicle location systems of a transit system to coordinate the transit of the rider. In additional aspects of the device, the system facilitates the delivery of signal, cues, or other communication to the transit rider to enable the rider to safely and effectively use the transit system without the immediate presence of a guide or supervisor. The device may also be utilized to prompt the transit rider responsive to location information and knowledge of the transit system's path from transit system status information. The prompts can be used to cue actions from the rider, such as preparing to exit the transit vehicle and signaling by the transit rider for the transit vehicle to make a stop. The present invention provides an improved method of detecting an upcoming destination location and prompting the transit rider accordingly in the Travel Assistant Device.

In one embodiment of the present invention, the method of providing an upcoming destination alert to a user data comprises establishing a triggering location, a current location, and a first predetermined distance from the triggering location; and triggering a first alert responsive to the current location being within the first predetermined distance of the triggering location. The method may further comprise establishing a destination location and a destination region about the destination location; and triggering a second alert responsive to the current location being within the destination region. The method may further comprise establishing a first region about the triggering location, a second region about the triggering location larger than the first region, a travel speed at the current location, and a predetermined speed threshold; and triggering a second alert responsive to the current location lying within the second region but outside the first region and the travel speed less than the predetermined speed threshold. The method may further comprise triggering a second alert responsive to the current location lying within the first region and the travel speed greater than the predetermined speed threshold. The method may further comprises establishing a path between the triggering location and the destination location; and triggering a second alert responsive to the current location lying within the second region, but outside the first region, the travel speed less than the predetermined speed threshold, and the current location lying on the path between the triggering location and the destination location. The method may further comprise establishing a region about the triggering location; and triggering the first alert responsive to the current location being within the region.

In another embodiment, the method of providing a destination alert to a user comprises establishing a triggering location, a current location, and a first predetermined distance from the triggering location; and triggering a first alert responsive to the current location being within the first predetermined distance of the triggering location. The method may further comprise establishing a destination location and a predetermined distance from the destination location; and triggering a second alert responsive to the current location being within the predetermined distance of the destination location. The method may further comprise establishing a second and a third predetermined distance from the triggering location, a predetermined speed threshold, a travel speed at the current location; and triggering a second alert responsive to the current location being between the second and third predetermined distances from the triggering location, and the travel speed less than the predetermined speed threshold. The method may further comprise triggering a second alert responsive to the current location being less than the second predetermined distance from the triggering location and the travel speed greater than the predetermined threshold. The method may further comprise establishing a path between the triggering location and the destination location; and triggering a second alert responsive to the current location between the second and third predetermined distances from the triggering location, the travel speed less than a predetermined speed threshold, and the current location lying on the path between the triggering location and the destination location. The method may further comprise triggering the first alert responsive to the current location being less than the second predetermined distance from the triggering location.

The first alert may prompt the rider that the destination location is approaching and to prepare for departure from the transit system and the second alert may prompt the rider that the destination location is the upcoming scheduled stop and to depart the transit system at the stop.

In another embodiment of the present invention, the first alert is only triggered once. In another embodiment of the present invention, the second alert is only triggered once. Additionally, the method may only trigger the first alert or the method may only trigger the second alert. In a further embodiment, multiple alerts may be triggered.

In yet another embodiment, the method of providing a destination alert to the user comprises establishing a triggering location, a current location, and a first predetermined distance from the triggering location; and triggering an alert responsive to the current location being within the first predetermined distance from the triggering location. The method may further comprise establishing a destination location and a destination region about the destination location; and triggering the alert responsive to the current location being within the destination region. The method may further comprise establishing a first and second region about the triggering location, wherein the second region is larger than the first region, a travel speed at the current location, and a predetermined speed threshold; and triggering the alert responsive to the current location lying within the second region, but outside the first region and the travel speed less than the predetermined speed threshold. The method may further comprise triggering the alert responsive to the current location lying within the first region and the travel speed greater than the predetermined speed threshold. The method may further comprise establishing a path between the triggering location and the destination location; and triggering the alert responsive to the current location lying within the second region, but outside the first region and on the path between the triggering location and the destination location, and the travel speed less than the predetermined speed threshold.

In yet a further embodiment, the method of providing a destination alert to the user comprises establishing a triggering location, a current location, and a first predetermined distance from the triggering location; and triggering an alert responsive to the current location being within the first predetermined distance from the triggering location. The method may further comprise establishing a destination location and a predetermined distance from the destination location; and triggering the alert responsive to the current location being within the predetermined distance of the destination location. The method may further comprise establishing a second and third predetermined distance from the triggering location, a predetermined speed threshold, and a travel speed at the current location; and triggering the alert responsive to the current location being between the second and third predetermined distances from the triggering location, and the travel speed less than the predetermined speed threshold. The method may further comprise triggering the alert responsive to the current location being less than the second predetermined distance from the triggering location and the travel speed greater than the predetermined speed threshold. The method may further comprise establishing a path between the triggering location and the destination location; and triggering the alert responsive to the current location being between than the second and third predetermined distances from the triggering location and lying on the path between the triggering location and the destination location, and the travel speed less than a predetermined speed threshold.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention provides a method of detecting an upcoming destination location in a transit system and alerting a transit rider of the upcoming location. The detection method may be implemented in software running on a mobile device, such as a Global Positioning System (GPS)-enabled mobile phone. The detection method may be used in real-time and may be implemented to provide the transit rider with audio alerts, such as "Get ready" or "Pull the cord now" and "Exit the bus now", at the appropriate times, which enables the rider to request a stop and exit the transit vehicle at the rider's intended destination location.

Figure 2:
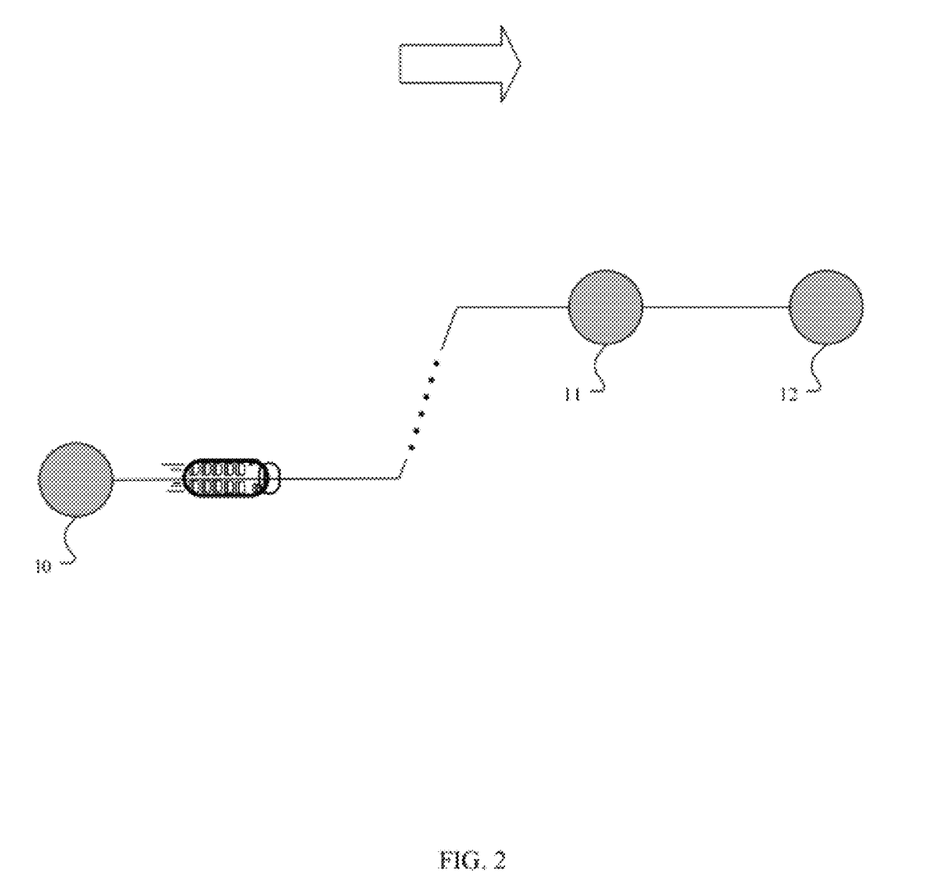
FIG. 2 is an illustration showing an example transit route.

The detection method defines a transit trip as a series of segments, as illustrated in FIG. 2. Each segment includes starting location 10 where the rider boards the transit vehicle, and an ending location, or destination location 12, where the rider plans to exit the transit vehicle. A segment also contains a second-to-last stop, or triggering location 11, which is the scheduled transit stop immediately prior to the destination location according to the transit system's schedule and route.

The detection method may provide an alert to the transit rider as soon as the transit vehicle passes the triggering location (11) or after the vehicle has stopped at the triggering location (11) and resumed travel in order to give the rider as much advance notice as possible before he or she must exit the transit vehicle. Preferably, the alert is not given prior to the vehicle arriving at and departing from the triggering location (11), or the rider will incorrectly be prompted to exit the vehicle at the triggering location (11). Preferably, the alert is not given too close to the destination location (12), or the vehicle may not be able to successfully stop in time, causing the transit rider to miss their intended stop and exit the vehicle at the location visited after his or her destination location (12).

The detection method takes into account two approaches to detect the destination location (12) for each segment to alert the rider to request a destination location (12) as early as possible while not providing the prompt too early. The first approach is utilized when the transit vehicle is not going to stop at the triggering location for the current segment. The second approach is utilized when the vehicle stops at the triggering location (11) and then resumes travel towards the destination location (12) for the current segment.

The detection method provides numerous benefits over the simple geo-fencing methods of the prior art. In the present method, there is no delay in an alert if the transit system does not stop at the triggering location (11), as there may be in geo-fencing methods. Instead, the present method alerts the rider right as the transit vehicle passes through the triggering location (11). In addition, in the present method, there are no false alerts while the transit vehicle is stopped at the triggering location (11), as there may be in geo-fencing methods. Instead, the present method waits until the transit vehicle has started to move away from the stop to alert the rider. Also, in the present method, the rider receives alerts dynamically based on the location of the triggering location (11), thereby increasing the alert time given to rider, as compared to geo-fencing methods. Further, the present method provides protection against alerting the rider too early in cases where roads have sharp turns, which may be an issue in geo-fencing methods.

Figure 3:
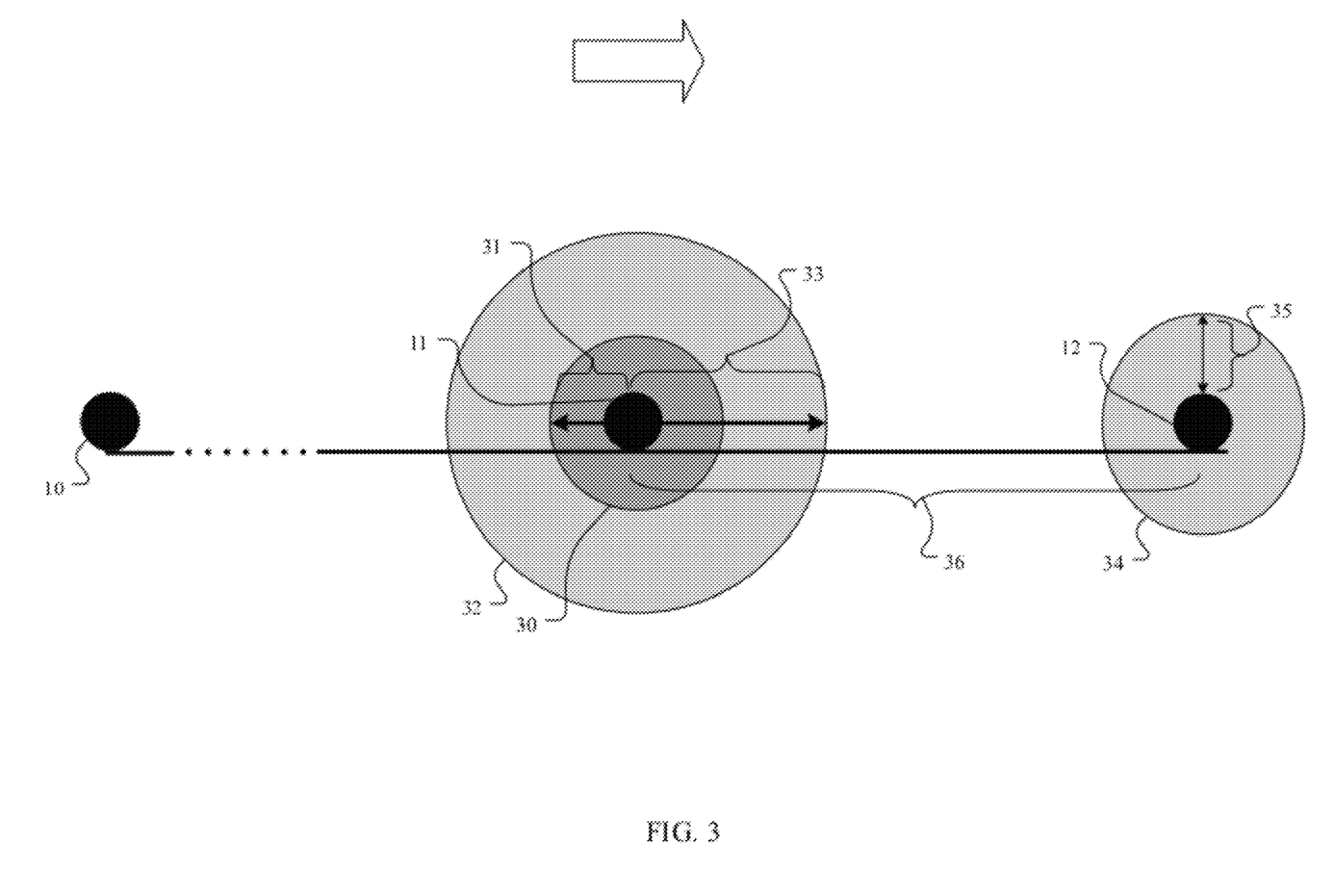
FIG. 3 is an illustration showing, the starting location, the triggering location, the two corresponding regions around the triggering location, the destination location, and the region surrounding the destination location in accordance with an embodiment of the present invention.

An embodiment of the detection method is illustrated in FIG. 3. The transit rider begins traveling at starting location 10 and continues on the transit vehicle through triggering location 11 until he or she reaches destination location 12 and exits the transit vehicle. Triggering location 11 is surrounded by two regions, first region 30, having a radius 31, located within second region 32, having radius 33. The regions shown in the figures and described here are circular; however, the regions may consist of any shape or even a simple line from the stop projecting outward. These regions surround triggering location 11 for each segment that the rider travels and are used by the detection method in detecting destination location 12. In addition, destination location 12 is surrounded by destination region 34, which has radius 35. As the rider comes within a predetermined distance of triggering location 11, a first alert is triggered. This first alert may provide an audio alert telling the rider to "get ready" or may be any type of notification to the rider that his or her stop is approaching. Once the transit vehicle enters first region 30, the speed of the vehicle is compared to a predetermined speed threshold. If the speed of the transit vehicle is above the speed threshold, then the transit vehicle is continuing past triggering location 11 without stopping. In this case, a second alert will be sent to the rider while he or she is in the first region. The second alert may provide an audio alert telling the rider to "get off the vehicle," "pull chord now," or "exit at the next stop" or may be any type of notification to the rider that his or her stop is imminent. If the speed of the transit vehicle is below the speed threshold, then the transit vehicle is making a stop at triggering location 11. In this case, the second alert will be sent to the rider either as transit vehicle gains enough speed to overcome the speed threshold in the first region (30) or, regardless of speed, in the second region (32). If the distances between triggering location 11 and destination location 12 are such that the second alert has not been given to the rider, but should be because of the close proximity of approaching destination location 12, the second alert will also be sent if the transit vehicle is within destination region 34.

In another embodiment of the present invention, the method only triggers the first alert. In an additional embodiment, the method only triggers the second alert. In a further embodiment, multiple alerts may be triggered.

Example 1

Figure 4:
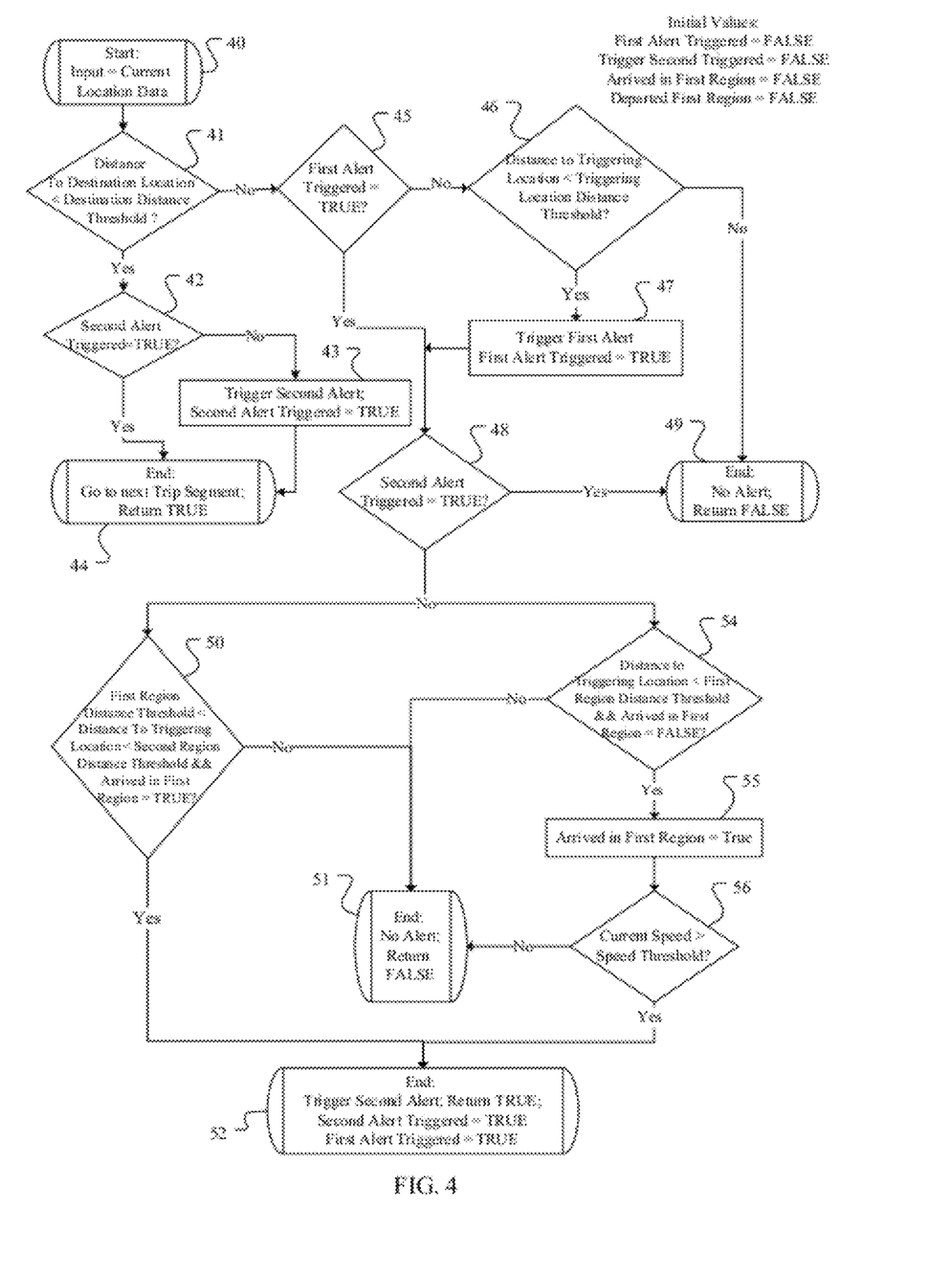
FIG. 4 is a flowchart of the detection method providing two alerts in accordance with an embodiment of the present invention.

A flowchart of an embodiment of the detection method is shown in FIG. 4. An application, such as a navigation service provider, calls the detection method and passes in newly calculated real-time location data. The method is called with new location data every time a new position is calculated. For each path traveled, the method tracks a number of variables, including whether the first alert has been triggered, whether the second alert has been triggered, whether the rider has arrived in the first region (30), and whether the rider has departed the first region (30). The value of each variable is set to false at the beginning of a trip. Once the trip is completed and the rider has arrived at his or her destination location (12), the variables are reset to false for the next trip.

The method begins by taking the rider's current location as input in operation 40. The distance from the current location to the destination location (12) is calculated and then compared to a predetermined destination distance threshold, such as the destination region radius (35), in operation 41. If the distance between the current location and the destination location (12) is less than the predetermined destination distance threshold, then the rider is located within the destination region (34). Therefore, the method moves to operation 42 and determines if the second alert has been triggered yet. If the second alert has been triggered, then the method returns a true value to the calling application in operation 44, indicating that the destination location (12) has been detected and both the first and second alerts have been given to the rider. If the second alert has not been triggered in operation 42, then the method triggers the second alert in operation 43 and then returns a true value to the calling application in operation 44.

If the distance between the current location and the destination location (12) is greater than the predetermined destination distance threshold in operation 41, then the method determines whether the first alert has been triggered in operation 45.

If the first alert has not been triggered, then the distance from the current location to the triggering location (11) is determined and compared to a predetermined triggering distance threshold in operation 46. If the distance is greater than predetermined triggering location distance threshold, then no alert is sent and the method returns false to the calling application in operation 49. In this case, the rider is too far from the location (11) to issue an alert. If the distance is less than the predetermined triggering location distance threshold, then the rider is close enough to location (11) to trigger an alert. Therefore, the first alert is triggered and the variable tracking whether the first alert has been triggered is set to true in operation 47. Then the method determines if the second alert has been triggered in operation 48. If the second alert has been triggered, then there is no need to send another alert so the method does not send an alert and returns a false value to the calling application in operation 49.

If the first alert has been triggered in operation 45, then the method determines if the second alert has been triggered in operation 48. If the second alert has been triggered, then there is no need to send another alert so the method does not send an alert and returns a false value to the calling application in operation 49.

If the method determines that the second alert has not been triggered in operation 48, then the method simultaneously executes operation 50 and operation 54 to determine if the rider is in a location in which a second alert needs to be sent.

In operation 50, the method determines the distance from the current location to the triggering location (11). If the distance to the triggering location (11) is between the predetermined first region distance (31) and predetermined second region distance (33) (or within the second region (32) but outside the first region (30)), and the variable that determines whether the rider has arrived in the first region (30) has a true value, then the second alert is triggered, the first and second alert variables are set to true, and a true value is returned to the calling application in operation 52. This case occurs when the rider has stopped at the triggering location (11) and has left the first region but is still located within the second region (32).

In operation 50, if the distance to the triggering location (11) is not between predetermined first region distance (31) and predetermined second region distance (33) or the variable that determines whether the rider has arrived in the first region (30) has a false value, then no alert is triggered and the method returns a false value to the calling application in operation 51.

In operation 54, the method determines the distance from the current location to the triggering location (11). If the distance to the triggering location (11) is less than the predetermined first region distance (31), (or within the first region (30)) and the variable that determines whether the rider has arrived in the first region (30) has a false value, then the variable that determines whether the rider has arrived in the first region (30) is set to true in operation 55. Then the current speed of the rider is compared to the predetermined speed threshold to determine if the transit vehicle is going to stop at the triggering location (11) or pass by it in operation 56. If the current speed is greater than the predetermined speed threshold, then the transit vehicle is not stopping at the triggering location (11). Therefore, the second alert is triggered, the first and second alert variables are set to true, and a true value is returned to the calling application in operation 52. If the current speed is less than the predetermined speed threshold, then the transit vehicle is going to stop at the triggering location (11) so no alert is triggered and the method returns a false value to the calling application in operation 51.

In operation 54, if the distance to the triggering location (11) is greater than the predetermined first region distance (31) or the variable that determines whether the rider has arrived in the first region (30) has a true value, then no alert is triggered and the method returns a false value to the calling application in operation 51.

Example 2

Figure 5:
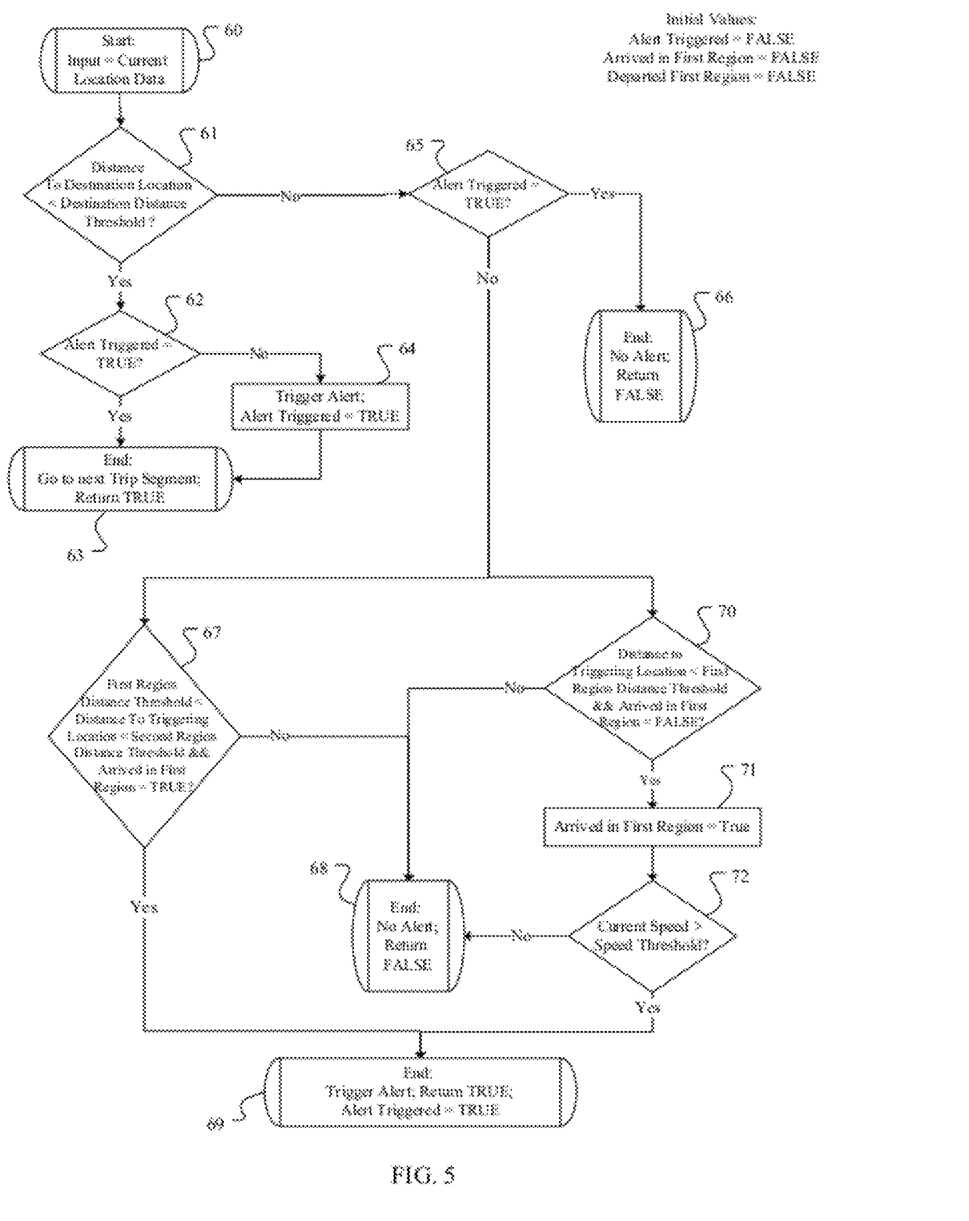
FIG. 5 is a flowchart of the detection method providing a single alert in accordance with an embodiment of the present invention.

A flowchart of an embodiment of the detection method is shown in FIG. 5. An application calls the detection method and passes in newly calculated real-time location data. The method is called with new location data every time a new position is calculated. For each path traveled, the method tracks a number of variables, including whether the alert has been triggered, whether the rider has arrived in the first region (30), and whether the rider has departed the first region (30). The value of each variable is set to false at the beginning of a trip. Once the trip is completed and the rider has arrived at his or her destination location (12), the variables are reset to false for the next trip.

The method begins by taking the rider's current location as input in operation 60. The distance from the current location to the destination location (12) is calculated and then compared to a predetermined destination distance threshold, such as the destination region radius (35), in operation 61. If the distance between the current location and the destination location (12) is less than the predetermined destination distance threshold, then the rider is located within the destination region (34). Therefore, the method moves to operation 62 and determines if the alert has been triggered yet. If the alert has been triggered, then the method returns a true value to the calling application in operation 63, indicating that the destination location (12) has been detected and the alert has been given to the rider. If the alert has not been triggered in operation 62, then the method triggers the alert in operation 64 and then returns a true value to the calling application in operation 63.

If the distance between the current location and the destination location (12) is greater than the predetermined destination distance threshold in operation 61, then the method determines whether the alert has been triggered in operation 65.

If the alert has been triggered in operation 65, then there is no need to send another alert. Therefore, the method does not send an alert and returns a false value to the calling application in operation 66.

If the method determines that the alert has not been triggered in operation 65, then the method simultaneously executes operation 67 and operation 70 to determine if the rider is in a location in which the alert needs to be sent.

In operation 67, the method determines the distance from the current location to the triggering location (11). If the distance to the triggering location (11) is between the predetermined first region distance (31) and predetermined second region distance (33) (or within the second region (32) but outside the first region (30)), and the variable that determines whether the rider has arrived in the first region (30) has a true value, then the alert is triggered, the alert variables is set to true, and a true value is returned to the calling application in operation 69. This case occurs when the rider has stopped at the triggering location (11) and has left the first region but is still located within the second region (32).

In operation 67, if the distance to the triggering location (11) is not between predetermined first region distance (31) and predetermined second region distance (33) or the variable that determines whether the rider has arrived in the first region (30) has a false value, then the alert is not triggered and the method returns a false value to the calling application in operation 68.

In operation 70, the method determines the distance from the current location to the triggering location (11). If the distance to the triggering location (11) is less than the predetermined first region distance (31), (or within the first region (30)) and the variable that determines whether the rider has arrived in the first region (30) has a false value, then the variable that determines whether the rider has arrived in the first region (30) is set to true in operation 71. Then the current speed of the rider is compared to the predetermined speed threshold to determine if the transit vehicle is going to stop at the triggering location (11) or pass by it in operation 72. If the current speed is greater than the predetermined speed threshold, then the transit vehicle is not stopping at the triggering location (11). Therefore, the alert is triggered, the alert variable is set to true, and a true value is returned to the calling application in operation 69. If the current speed is less than the predetermined speed threshold, then the transit vehicle is going to stop at the triggering location (11). Therefore, the alert is not triggered and the method returns a false value to the calling application in operation 68.

In operation 70, if the distance to the triggering location (11) is greater than the predetermined first region distance (31) or the variable that determines whether the rider has arrived in the first region (30) has a true value, then the alert is not triggered and the method returns a false value to the calling application in operation 68.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between. Now that the invention has been described,

What is claimed is:

1. A method of providing a destination alert to a user, comprising:

establishing a triggering location;

establishing a current location;

establishing a first predetermined distance from the triggering location;

triggering a first alert responsive to the current location being within the first predetermined distance of the triggering location;

establishing a first region about the triggering location;

establishing a second region about the triggering location, wherein the second region is larger than the first region;

establishing a travel speed at the current location;

establishing a predetermined speed threshold; and triggering a second alert responsive to the current location lying within the second region and lying outside the first region and the travel speed less than the predetermined speed threshold.

2. A method of providing a destination alert to a user, comprising:
- establishing a triggering location;
- establishing a current location;
- establishing a first predetermined distance from the triggering location;
- triggering a first alert responsive to the current location being within the first predetermined distance of the triggering location;
- establishing a first region about the triggering location;
- establishing a travel speed at the current location;
- establishing a predetermined speed threshold; and
- triggering a second alert responsive to the current location lying within the first region and the travel speed greater than the predetermined speed threshold.

3. A method of providing a destination alert to a user, comprising:
- establishing a triggering location;
- establishing a current location;
- establishing a first predetermined distance from the triggering location;
- triggering a first alert responsive to the current location being within the first predetermined distance of the triggering location;
- establishing a first region about the triggering location;
- establishing a second region about the triggering location, wherein the second region is larger than the first region;
- establishing a travel speed at the current location;
- establishing a predetermined speed threshold;
- establishing a destination location;
- establishing a path between the triggering location and the destination location; and
- triggering a second alert responsive to the current location lying within the second region and lying outside the first region, the travel speed less than the predetermined speed threshold, and the current location lying on the path between the triggering location and the destination location.

4. A method of providing a destination alert to a user, comprising:
- establishing a triggering location;
- establishing a current location;
- establishing a first predetermined distance from the triggering location;
- triggering a first alert responsive to the current location being within the first predetermined distance of the triggering location;
- establishing a second predetermined distance from the triggering location;
- establishing a third predetermined distance from the triggering location;
- establishing a predetermined speed threshold;
- establishing a travel speed at current location; and
- triggering a second alert responsive to the current location being less than the second predetermined distance from the triggering location, the current location being greater than the third predetermined distance from the triggering location, and the travel speed less than the predetermined speed threshold.

5. A method of providing a destination alert to a user, comprising:
- establishing a triggering location;
- establishing a current location;
- establishing a first predetermined distance from the triggering location;
- triggering a first alert responsive to the current location being within the first predetermined distance of the triggering location;
- establishing a second predetermined distance from the triggering location;
- establishing a predetermined speed threshold;
- establishing a travel speed at current location; and
- triggering a second alert responsive to the current location being less than the second predetermined distance from the triggering location and the travel speed greater than the predetermined speed threshold.

6. A method of providing a destination alert to a user, comprising:
- establishing a triggering location;
- establishing a current location;
- establishing a first predetermined distance from the triggering location;
- triggering a first alert responsive to the current location being within the first predetermined distance of the triggering location;
- establishing a second predetermined distance from the triggering location;
- establishing a third predetermined distance from the triggering location;
- establishing a predetermined speed threshold;
- establishing a travel speed at current location;
- establishing a destination location;
- establishing a path between the triggering location and the destination location; and
- triggering a second alert responsive to the current location being less than the second predetermined distance from the triggering location, the current location being greater than the third predetermined distance from the triggering location, the travel speed less than a predetermined speed threshold, and the current location lying on the path between the triggering location and the destination location.

7. A computer program product for enabling a computer to provide a destination alert to a user comprising:
- software instructions for enabling the computer to perform predetermined operations; and
- a computer readable medium bearing the software instructions;
- the predetermined operations comprising:
  - establishing a triggering location,
  - establishing a current location,
  - establishing a first predetermined distance from the triggering location,
  - triggering a first alert responsive to the current location being within the first predetermined distance of the triggering location,
  - establishing a first region about the triggering location,
  - establishing a second region about the triggering location, wherein the second region is larger than the first region,
  - establishing a travel speed at the current location,
  - establishing a predetermined speed threshold, and
  - triggering a second alert responsive to the current location lying within the second region and lying outside the first region and the travel speed less than the predetermined speed threshold,
- wherein the computer provides a destination alert to a user.

8. A computer program product for enabling a computer to provide a destination alert to a user comprising:
- software instructions for enabling the computer to perform predetermined operations; and a computer readable medium bearing the software instructions;
the predetermined operations comprising:
   establishing a triggering location,
   establishing a current location,
   establishing a first predetermined distance from the triggering location,
   triggering a first alert responsive to the current location being within the first predetermined distance of the triggering location,
   establishing a first region about the triggering location,
   establishing a travel speed at the current location,
   establishing a predetermined speed threshold, and
   triggering a second alert responsive to the current location lying within the first region and the travel speed greater than the predetermined speed threshold,
wherein the computer provides a destination alert to a user.

9. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location,
      triggering a first alert responsive to the current location being within the first predetermined distance of the triggering location,
      establishing a first region about the triggering location,
      establishing a second region about the triggering location, wherein the second region is larger than the first region,
      establishing a travel speed at the current location,
      establishing a predetermined speed threshold,
      establishing a destination location,
      establishing a path between the triggering location and the destination location, and
      triggering a second alert responsive to the current location lying within the second region and lying outside the first region, the travel speed less than the predetermined speed threshold, and the current location lying on the path between the triggering location and the destination location,
   wherein the computer provides a destination alert to a user.

10. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location,
      triggering a first alert responsive to the current location being within the first predetermined distance of the triggering location,
      establishing a second predetermined distance from the triggering location;
      establishing a third predetermined distance from the triggering location;
      establishing a predetermined speed threshold;
      establishing a travel speed at current location; and
      triggering a second alert responsive to the current location being less than the second predetermined distance from the triggering location, the current location being greater than the third predetermined distance from the triggering location, and the travel speed less than the predetermined speed threshold,
   wherein the computer provides a destination alert to a user.

11. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location,
      triggering a first alert responsive to the current location being within the first predetermined distance of the triggering location,
      establishing a second predetermined distance from the triggering location;
      establishing a predetermined speed threshold;
      establishing a travel speed at current location; and
      triggering a second alert responsive to the current location being less than the second predetermined distance from the triggering location and the travel speed greater than the predetermined speed threshold,
   wherein the computer provides a destination alert to a user.

12. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location,
      triggering a first alert responsive to the current location being within the first predetermined distance of the triggering location,
      establishing a second predetermined distance from the triggering location;
      establishing a third predetermined distance from the triggering location;
      establishing a predetermined speed threshold;
      establishing a travel speed at current location;
      establishing a destination location;
      establishing a path between the triggering location and the destination location; and
      triggering a second alert responsive to the current location being less than the second predetermined distance from the triggering location, the current location being greater than the third predetermined distance from the triggering location, the travel speed less than a predetermined speed threshold, and the current location lying on the path between the triggering location and the destination location,
   wherein the computer provides a destination alert to a user.

13. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a first region about the triggering location;
  establishing a second region about the triggering location, wherein the second region is larger than the first region;
  establishing a travel speed at the current location;
  establishing a predetermined speed threshold; and
  triggering the alert responsive to the current location lying within the second region and lying outside the first region and the travel speed less than the predetermined speed threshold.

14. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a first region about the triggering location;
  establishing a travel speed at the current location;
  establishing a predetermined speed threshold; and
  triggering the alert responsive to the current location lying within the first region and the travel speed greater than the predetermined speed threshold.

15. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a first region about the triggering location;
  establishing a second region about the triggering location, wherein the second region is larger than the first region;
  establishing a travel speed at the current location;
  establishing a predetermined speed threshold;
  establishing a destination location;
  establishing a path between the triggering location and the destination location; and
  triggering the alert responsive to the current location lying within the second region and lying outside the first region, the travel speed less than the predetermined speed threshold, and the current location lying on the path between the triggering location and the destination location.

16. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a second predetermined distance from the triggering location;
  establishing a third predetermined distance from the triggering location;
  establishing a predetermined speed threshold;
  establishing a travel speed at the current location; and
  triggering the alert responsive to the current location being less than the second predetermined distance from the triggering location, the current location being greater than the third predetermined distance from the triggering location, and the travel speed less than the predetermined speed threshold.

17. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a second predetermined distance from the triggering location;
  establishing a predetermined speed threshold;
  establishing a travel speed at current location; and
  triggering the alert responsive to the current location being less than the second predetermined distance from the triggering location and the travel speed greater than the predetermined speed threshold.

18. A method of providing a destination alert to a user, comprising:
  establishing a triggering location;
  establishing a current location;
  establishing a first predetermined distance from the triggering location;
  triggering an alert responsive to the current location being within the first predetermined distance from the triggering location;
  establishing a second predetermined distance from the triggering location;
  establishing a third predetermined distance from the triggering location;
  establishing a predetermined speed threshold;
  establishing a travel speed at current location;
  establishing a destination location;
  establishing a path between the triggering location and the destination location; and
  triggering the alert responsive to the current location being less than the second predetermined distance from the triggering location, the current location being greater than the third predetermined distance from the triggering location, the travel speed less than a predetermined speed threshold, and the current location lying on the path between the triggering location and the destination location.

19. A computer program product for enabling a computer to provide a destination alert to a user comprising:
  software instructions for enabling the computer to perform predetermined operations; and
  a computer readable medium bearing the software instructions;
  the predetermined operations comprising:
    establishing a triggering location,
    establishing a current location,
    establishing a first predetermined distance from the triggering location, and
    triggering an alert responsive to the current location being within the first predetermined distance from the triggering location, establishing a first region about the triggering location,
establishing a second region about the triggering location, wherein the second region is larger than the first region,
establishing a travel speed at the current location,
establishing a predetermined speed threshold, and
triggering the alert responsive to the current location lying within the second region and lying outside the first region and the travel speed less than the predetermined speed threshold,
wherein the computer provides a destination alert to a user.

20. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location, and
      triggering an alert responsive to the current location being within the first predetermined distance from the triggering location,
      establishing a first region about the triggering location,
      establishing a travel speed at the current location,
      establishing a predetermined speed threshold, and
      triggering the alert responsive to the current location lying within the first region and the travel speed greater than the predetermined speed threshold,
   wherein the computer provides a destination alert to a user.

21. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location, and
      triggering an alert responsive to the current location being within the first predetermined distance from the triggering location,
      establishing a first region about the triggering location,
      establishing a second region about the triggering location, wherein the second region is larger than the first region,
      establishing a travel speed at the current location,
      establishing a predetermined speed threshold,
      establishing a destination location,
      establishing a path between the triggering location and the destination location, and
      triggering the alert responsive to the current location lying within the second region and lying outside the first region, the travel speed less than the predetermined speed threshold, and the current location lying on the path between the triggering location and the destination location,
   wherein the computer provides a destination alert to a user.

22. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location, and
      triggering an alert responsive to the current location being within the first predetermined distance from the triggering location,
      establishing a second predetermined distance from the triggering location,
      establishing a third predetermined distance from the triggering location,
      establishing a predetermined speed threshold,
      establishing a travel speed at the current location, and
      triggering the alert responsive to the current location being less than the second predetermined distance from the triggering location, the current location being greater than the third predetermined distance from the triggering location, and the travel speed less than the predetermined speed threshold,
   wherein the computer provides a destination alert to a user.

23. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location, and
      triggering an alert responsive to the current location being within the first predetermined distance from the triggering location,
      establishing a second predetermined distance from the triggering location,
      establishing a predetermined speed threshold,
      establishing a travel speed at current location, and
      triggering the alert responsive to the current location being less than the second predetermined distance from the triggering location and the travel speed greater than the predetermined speed threshold,
   wherein the computer provides a destination alert to a user.

24. A computer program product for enabling a computer to provide a destination alert to a user comprising:
   software instructions for enabling the computer to perform predetermined operations; and
   a computer readable medium bearing the software instructions;
   the predetermined operations comprising:
      establishing a triggering location,
      establishing a current location,
      establishing a first predetermined distance from the triggering location, and
      triggering an alert responsive to the current location being within the first predetermined distance from the triggering location,
      establishing a second predetermined distance from the triggering location,
      establishing a third predetermined distance from the triggering location,
      establishing a predetermined speed threshold,
      establishing a travel speed at current location, establishing a destination location,
establishing a path between the triggering location and the destination location, and
triggering the alert responsive to the current location being less than the second predetermined distance from the triggering location, the current location being greater than the third predetermined distance from the triggering location, the travel speed less than a predetermined speed threshold, and the current location lying on the path between the triggering location and the destination location,
wherein the computer provides a destination alert to a user.

* * * * *